United States Patent Office 3,037,496
Patented June 5, 1962

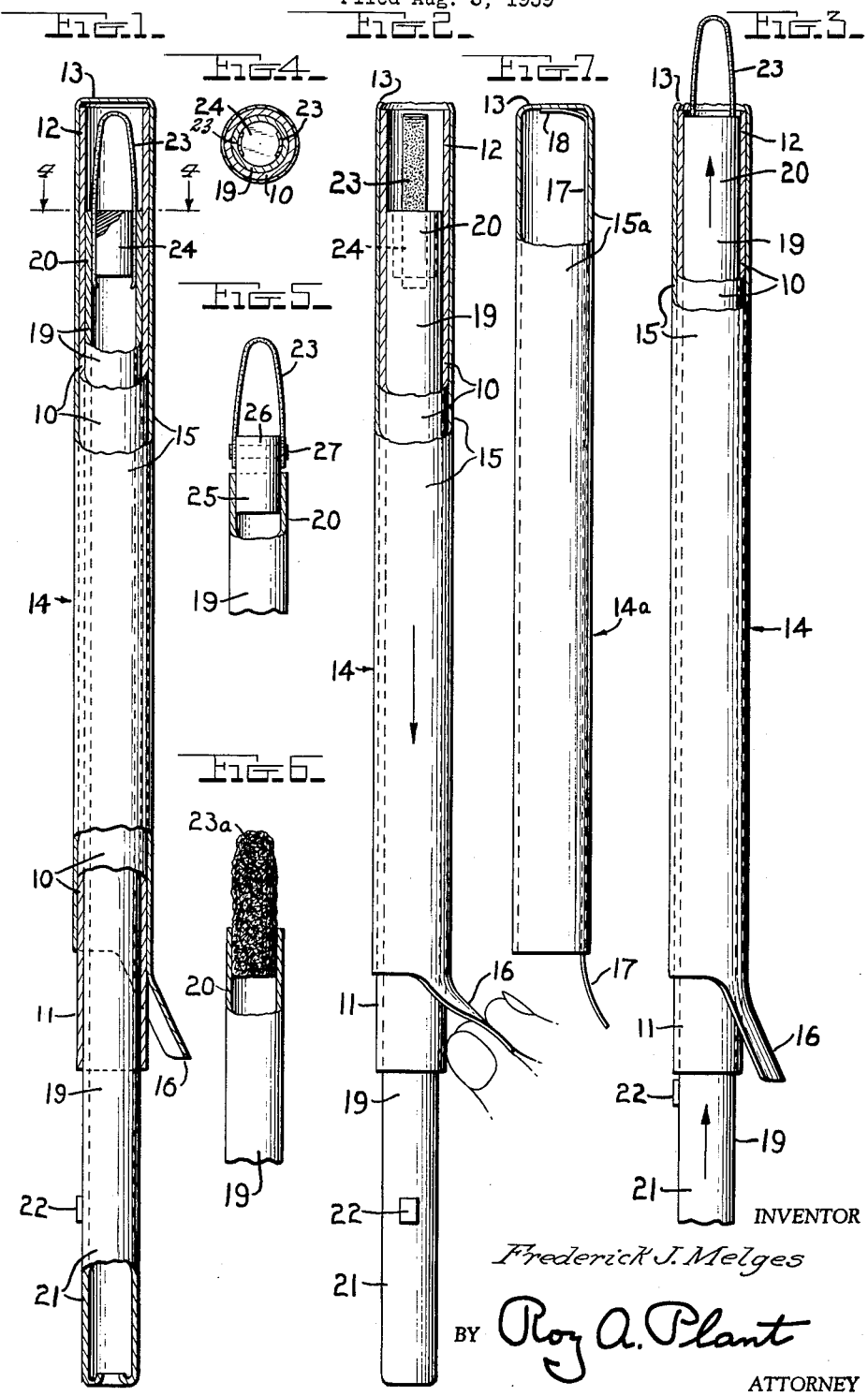

3,037,496
FERTILITY TESTING APPARATUS
Frederick J. Melges, 314 Orchard Ave.,
Battle Creek, Mich.
Filed Aug. 3, 1959, Ser. No. 831,147
18 Claims. (Cl. 128—2)

The present invention relates broadly to testing apparatus and in its more specific phases to an apparatus adapted for either office or home use in checking and determining a woman's ovulation cycle during her child bearing age.

The problem of how to overcome lack of success of childless couples in having children, as well as the matter of planned parenthood where the wife's health will be endangered by further child bearing, as well as where the family is as large as can be adequately fed, clothed, and housed, has led to a great deal of research. This research has shown that there is a repeating rhythm or cycle through which a woman passes during each of her menstral cycles, with a definite short period in that menstral cycle during which conception is possible. The accurate spotting of this short period of fertility is the thing which causes considerable difficulty. One system utilized for the determination of this is what is called the "basal thermal shift" plan where the woman's temperature drops and then rises and continues for several days on a higher level, with the point of temperature drop theoretically being at the ovulation time.

A newer method of checking the ovulation time, which is now coming into use, is the "cervical glucose" test which is usually carried on in a doctor's office with special instruments. It has been found that at ovulation time there is a relatively sharp rise followed by a drop in the amount or concentration of glucose in the mucus cascade which pours from the cervix, and it is the accurate determination as to when this sharp rise in the content of glucose in the cervical mucus takes place which causes the difficulty. A color changing tape, commercially sold as "Tes-Tape," and which, according to current practice, is impregnated with the enzyme, glucose oxidase, is now used for making this test. The test, however, must be made directly at the outlet of the cervix, since if the "Tes-Tape" is brought into contact with other vaginal secretions first, the test is not accurate.

The use of vaginal dialators and special syringes, commonly found in offices of doctors specializing in obstetrics, makes possible the accurate contacting, by the doctor, of the "Tes-Tape" with the mucus cascade as it flows from the cervical outlet. This is an expensive as well as relatively inconvenient and time consuming matter for the woman being tested, and for which there is no substitute thoroughly satisfactory and accurate, low cost, apparatus and procedure which can be used by the patient herself at home. It was a recognition of this problem, and the complete lack of a wholly satisfactory commerical solution to same adapted for self use at home, which led to the conception and development of the present invention.

Accordingly among the objects of the present invention is the provision of a novel device for testing cervical secretions in women, to determine the presence or absence of glucose, a sharp increase in the presence of which usually exists, except with diabetics, when ovulation is taking place or is about to occur. Therefore, when such presence is revealed by the tester, the tested woman may take steps to either obstruct or facilitate possible impregnation, as she may wish.

A further object is to provide a novel tester of the character set forth of such simple construction and so easily usable that a woman may readily test her own cervical secretions at home without the aid of a physician or other scientifically trained practitioner.

Another object is to provide a tester in which a testing element, which is to be exposed to the action of the cervical secretions, is shielded against contact with other vaginal secretions, during insertion and withdrawal of the tester.

Still another object is to mount the testing element on a plunger slidable in a tubular barrel, said testing element being confined and shielded within an end of said barrel and being projectable for use only when a rupturable closure for said end of said barrel is ruptured after insertion of the testing end of the device to the outlet of the cervix.

Yet another object is to make novel provision for rupturing the aforesaid rupturable closure which protects the testing element within the tubular barrel during insertion of the testing end of the device to the convex.

A still further object is to include in the initially protected aforesaid testing element a substance which will cause it to change color when the tested cervical secretion contains glucose in amount sufficient to indicate ovulation.

Yet another object is to provide a simple and inexpensive tester to be used once and thrown away.

Still further objects and advantages of the present invention will appear as the description proceeds.

To the accomplishment of the foregoing and related ends, the invention, then, consists of the means hereinafter fully described and particularly pointed out in the claims, the annexed drawing and the following description setting forth in detail certain means for carrying out the invention, such disclosed means illustrating, however, but several of various ways in which the principle of the invention may be used.

In the annexed drawing:

FIGURE 1 is a side elevation of the device, partially in section, and in readiness for use.

FIGURE 2 is a similar partially sectioned view after insertion to the outlet of the cervix and with the rupturable barrel closure ruptured, in readiness for projection of the testing element into the mucus cascade flowing from the outlet of the cervix, the plunger and testing element being turned 90° from its position in FIGURE 1 solely to view said plunger and element from a different direction.

FIGURE 3 is a similar partially sectioned view with the testing element projected into testing position.

FIGURE 4 is a transverse sectional view as seen on line 4—4 of FIGURE 1, looking in the direction of the arrows.

FIGURE 5 is a partially sectioned detail view showing a different way of connecting the testing tape to the end of the plunger.

FIGURE 6 is a similar partially sectioned view disclosing a different form of testing element.

FIGURE 7 is a side elevation, partly in section, diagrammatically showing a construction in which a pull strand is provided for rupturing the rupturable end of the barrel closure.

The drawing illustrates preferences, and although the various structural elements shown will be rather specifically described, attention is invited to the possibility of making variations over the specific disclosure without departing from the obvious spirit and intent of the invention.

A tubular, substantially rigid barrel 10 is provided for insertion into the vagina up to the cervix, said barrel being sufficiently long to leave its outer end exposed after full insertion. A length of about eight inches is preferred for this barrel 10 which may well be formed from sterile cardboard or the like. One end 11 of this barrel is open, and the other end 12 thereof is closed by any suitable sterile and rupturable closure 13. Pull means is connected to this rupturable closure 13 which, in one convenient form, extends substantially to the end 11 of the barrel 10, said pull means being manually operable to rupture said rupturable closure, as seen in FIGURE 2, after insertion of the end of said barrel 10 substantially into contact with the cervix.

In the form of construction shown in FIGURES 1 to 4, the rupturable closure 13 is the closed end of a sterile bag or sleeve 14 which snugly, but freely, surrounds the barrel 10; and the pull means is the bag or sleeve wall 15 which is preferably about seven to seven and one-half inches long. To facilitate pulling of the wall 15 to rupture the closure 13, said wall may have a pull tab 16 at its open end.

In FIGURE 7, the rupturable closure 13 is again the closed end of a sterile bag or sleeve 14a. However, in this view, the pull means for rupturing the closure 13 is in the form of a longitudinal pull strand or cord 17 secured at 18 to the closed end of the bag or sleeve and projecting accessibly from the open end of said bag or sleeve. The strand 17 may be either at the interior or exterior of the bag or sleeve wall 15a and the drawing is to be considered as diagrammatically illustrating same.

Both of the bags or sleeves 14 and 14a are preferably formed from a suitable flexible plastic or fibrous material, and while preferably substantially waterproof, are sufficiently thin or weakened to allow easy rupturing of the bag or sleeve end wall 13 as required for use. The pull strand 17 may also be formed from plastic or other suitable material, and may be integrally joined in conventional tearing manner to the rupturable closure end 13 of the bag or sleeve 14 or 14a.

A sterile plunger 19 extends slidably, and preferably closely fits, into the barrel 10, and has its inner end 20 normally spaced inwardly from the rupturable closure 13, as seen in FIGURE 1, prior to use of the assembly in prescribed manner. The outer end 21 of the plunger 19 projects accessibly from the barrel end 11 and preferably has a stop 22 for limiting the extent of movement of the plunger 19 toward the closure 13 as shown in FIGURE 13. This stop may be in the form of a physical projection, or purely visual as by means of markings or colored areas, and the drawing is intended to diagrammatically illustrate same. The plunger may be tubular, and for convenience of disposal, may well be formed from cardboard or the like, and is preferably about ten inches long for ease of handling and use.

The inner end 20 of the plunger 19 carries a testing element for exposure by contact with cervical secretions when said plunger is pushed inwardly to project a substantial portion of said testing element beyond the end of barrel 10 after rupturing the closure 13, as shown in FIGURE 3. In FIGURES 1 to 3, and FIGURE 5, the testing element is a length of tape 23, a satisfactory absorbent form of which is commonly known as "Testape." bent into U-shape and having its ends secured to the inner end 20 of the plunger 19. In FIGURE 6, however, the testing element is a mass of fluid absorbing fibrous material 23a, such as sterile cotton or gauze, secured in and projecting from the plunger inner end 20. Each form of testing element 23 or 23a includes a suitable substance which will cause it by chemical action to change color within a moderately short period of time when exposed to the sought ingredient (glucose) in the cervical secretions. To attain this color changing characteristic, impregnation of the testing element with the enzyme, glucose oxidase, is preferable and will cause a color change from yellow to green streaked yellow to green when exposed to increasing amounts of the sought secretion ingredient when present in the amounts normally found in the mucus cascade flowing from the cervix at the time of ovulation.

In the form of construction shown in FIGURES 1 to 4, inclusive, the U-shaped length of the specially treated tape 23 has its ends tightly held between the inner wall of the plunger 19 and a suitable plug 24 tightly inserted into the plunger inner end 20.

In FIGURE 5, a plug 25 has part of its length tightly inserted into the plunger inner end 20, leaving an end portion 26 of said plug projecting beyond said plunger end. The ends of the tape 23 lie against opposite sides of the projecting plug end 26 and are secured thereto by a suitable thickness encircling collar or the like 27, which is of smaller outside diameter than the inside diameter of barrel 10 through which it must slide under conditions of use.

A suitable adhesive or cement may also be employed, if desired, in securing the plugs 24 and 25 to the plunger inner end 20, and to the ends of the tape 23.

In FIGURE 6, one end of the fibrous mass 23a is suitably cemented in the plunger inner end 20.

The entire device is to be assembled with the various elements related as shown in FIGURE 1, and each said device may be marketed in an individual sterile wrapper or the like to protect it against contamination, or a number of the devices may be marketed in one sterile package; and the construction is so simple and so easily fabricated as to permit profitable mass marketing at a low price.

*Operation*

A woman wishing to use the device for the intended purpose inserts it into her vagina with the various elements related and assembled as shown in FIGURE 1, until the rupturable closure 13 touches the cervix. She then ruptures the closure 13 by pulling upon the tab 16 or the pull strand 17, as the case may be. She then slides the plunger 19 inward to project the testing element (23 or 23a) into contact with the cervical secretions where it is left for a minute or more to become impregnated with same. She then returns the testing element back into the barrel 10 by inward movement thereinto of plunger 19, and next withdraws the entire device from her vagina. After removal of the assembly she projects the testing element from the barrel 10 and visually inspects it. If the testing element has changed to a green streaked yellow or deep green color, she knows that ovulation is occurring, has very recently occurred, or is about to occur, depending upon what she has learned about color from tests made during the passage through previous rhythm cycles. No change in color indicates that the period of ovulation has not arrived or has passed. She may therefore act to either facilitate or obstruct possible impregnation, as she may wish.

During both insertion and removal of the device, in accordance with the present invention, the testing element will be effectively shielded against contact with vaginal secretions other than cervical and they cannot, therefore, interfere with the accuracy of the test.

From the foregoing, it will be seen that novel provision has been disclosed for attaining the desired ends. However, attention is again invited to the possibility of making variations over the present disclosure without departing from the obvious spirit and intent of the invention.

Other modes of applying the principle of my invention may be employed instead of those explained, change being made as regards the article and combinations herein disclosed, provided the means stated by any of the following claims or the equivalent of such stated means be employed.

I therefore particularly point out and distinctly claim as my invention:

1. A device of the class described for testing fluids to determine the presence or absence of a sought ingredient therein, which comprises an elongated open ended, substantially rigid, tubular member, a rupturable closure means freely fitting over said tubular member and closing one end of same, means for rupturing said closure means, said rupturing means extending longitudinally of said tubular means substantially to the open end of same, a plunger a little longer than said tubular member and closely fitting but slidable in the latter and projecting from the open end of same, and a testing element for fluid testing carried by the end of said plunger within said elongated tubular member and normally adjacent the closed end of same, said means for rupturing the closed end of said rupturable closure doing so in a manner permitting the testing end portion of said plunger to be extended out of the previously closed end of said tubular member and then returned thereinto, whereby said testing element is protected by said closure means until in position to be subjected to said fluid to be tested, whereupon said closure means may be ruptured, the testing element projected into contact with said fluid to be tested, and then returned into said tubular member for further protection while the device is being withdrawn from in contact with said fluid to be tested.

2. A device for insertion into the human vagina for testing cervical secretion to determine the presence or absence of a sought ingredient therein; said device comprising an elongated substantially rigid, tubular barrel having an open end, a rupturable closure normally closing the other end of said barrel, pull means connected to said rupturable closure and extending longitudinally of said barrel substantially to said open end thereof, said pull means being manually operable in cooperation with said tubular barrel to rupture said rupturable closure after insertion of said barrel to the cervix in the vagina, a plunger slidable in said barrel and having one end projecting a substantial distance beyond said open end thereof, the other end of said plunger being spaced inwardly from said rupturable closure, said barrel and plunger being sufficiently long to project accessibly from the vagina after unitary insertion thereof to the cervix in the vagina, and a cervical secretion testing element carried by said other end of said plunger and confined and shielded within the closed end of said barrel, said secretion testing element being projectable beyond the end of said barrel for exposure to the cervical secretion by inwardly sliding said plunger in said barrel after unitarily inserting said barrel and plunger and rupturing said rupturable closure as aforesaid; whereby upon return of said plunger to normal position, before withdrawal of the entire device from the vagina, the exposed testing element will be moved into said barrel and thus shielded from contact with other vaginal secretions during said withdrawal; and upon reprojection of said testing element from said barrel by means of said plunger, after said withdrawal, said testing element may be examined.

3. A structure as specified in claim 2, wherein said secretion testing element includes a substance which will cause it to change color upon exposure to the sought ingredient in the cervical secretion.

4. A structure as specified in claim 2, in which said secretion testing element is in the form of a piece of tape secured to and carried by said plunger, said tape being of a form which will change color when exposed to a sought ingredient.

5. A structure as specified in claim 2, in which said secretion testing element is in the form of a loop of tape secured to and projecting beyond said plunger, and in which said tape includes a substance which will cause it to change color upon exposure to the sought ingredient in the cervical secretion, and wherein said plunger has a stop means to determine the extent to which said loop of tape can be projected beyond the end of said tubular barrel.

6. A structure as specified in claim 2, in which said secretion testing element comprises a mass of fibrous material which is extendable from and then retractable into said barrel.

7. A structure as specified in claim 2, in which said secretion testing element is a mass of fibrous material so impregnated as to change color upon exposure to the sought ingredient in the cervical secretion.

8. A structure as specified in claim 2, in which said rupturable closure is the closed end of a sleeve snugly but slidably surrounding said tubular barrel, and in which a portion of the wall of said sleeve constitutes said pull means.

9. A structure as specified in claim 2, in which said rupturable closure is the closed end of a sleeve snugly surrounding said tubular barrel and in which said pull means is a pull strand connected with said closed end of the sleeve and movable lengthwise relative to said barrel to rupture the barrel closing end of said sleeve.

10. In a device of the class described having an elongated, substantially rigid, tubular barrel, an elongated barrel-receiving sleeve freely fitting said tubular barrel and having an open end and a closed rupturable end, said closed rupturable end of said free fitting sleeve being adjacent to and closing one end of said tubular barrel, and pull means connected with said rupturable end of said freely fitting sleeve and extending to the open end of the sleeve in position and in cooperation with said tubular barrel to rupture the rupturable end of said sleeve when said pull means is operably actuated.

11. A structure as specified in claim 10, in which said pull means is the wall of the sleeve.

12. A structure as specified in claim 10, in which said pull means is a pull strand connected with said rupturable end of the sleeve.

13. In a device of the class described having an elongated, substantially rigid, tubular barrel, a tubular plunger slidably fitting said barrel and having an open end, a plug tightly fitted in fixed position into said open end of said plunger, and a length of testing tape bent into U-shape, projecting longitudinally from said tubular plunger and having its ends held in fixed position between said plug and plunger, said plug and tape carried by said plunger also slidably fitting said tubular barrel.

14. A structure as specified in claim 13, in which said length of tape includes a substance which will cause it to change color by chemical action when exposed to a fluid being tested if a sought ingredient be present in said fluid.

15. In a device of the class described having an elongated, substantially rigid, tubular barrel, a tubular plunger slidably fitting said barrel and having an open end, a plug having part of its length tightly fitted in fixed position into said open end of said tubular plunger leaving the other end of said plug projecting from said plunger, a length of testing tape bent into U-shape and having its ends disposed against opposite sides of said projecting end of said plug, and means encircling said plug end and securing said tape ends against the same, said plug and tape carried by said plug mounted on said plunger also slidably fitting said tubular barrel.

16. A structure as specified in claim 15, in which said length of tape includes a substance which will cause it to change color by chemical action when exposed to a fluid being tested if a sought ingredient be present in said fluid.

17. In a device of the class described having an elongated, substantially rigid, tubular barrel, a tubular plunger closely but slidably fitting said barrel and having an open end and an elongated absorbent fibrous body fixedly anchored to and projecting beyond said open end of said plunger, stop means on said plunger for limiting the movement of said plunger through said barrel to a point where said fibrous body extends substantially out of said tubular barrel, said fibrous and fluid absorbing body constituting a testing element, said fibrous body also slidably fitting said tubular barrel for projection from and then retraction thereinto.

18. A structure as specified in claim 17, in which said fluid absorbing fibrous body is so impregnated with suitable chemicals as to change color by chemical action when subjected to a fluid being tested if a sought ingredient be present in said fluid.

References Cited in the file of this patent

UNITED STATES PATENTS

| | | |
|---|---|---|
| 1,256,831 | Rogers | Feb. 19, 1918 |
| 2,355,917 | Knight | Aug. 15, 1944 |
| 2,413,480 | Winter | Dec. 31, 1946 |
| 2,664,879 | Hardy | Jan. 5, 1954 |
| 2,847,000 | Nieburgs | Aug. 12, 1958 |
| 2,922,423 | Rickard et al. | Jan. 26, 1960 |
| 2,945,491 | Gibbs | July 19, 1960 |

FOREIGN PATENTS

| | | |
|---|---|---|
| 241,199 | Great Britain | Jan. 21, 1926 |

OTHER REFERENCES

"Ovulation Test" from Science, vol. 127, June 20, 1958, page 1435, 23–253 TP.